(12) United States Patent
Park et al.

(10) Patent No.: US 10,497,135 B2
(45) Date of Patent: Dec. 3, 2019

(54) METHOD AND DEVICE FOR PROCESSING IMAGE DATA

(71) Applicant: SAMSUNG ELECTRONICS CO., LTD., Suwon-si (KR)

(72) Inventors: Jeongsoo Park, Gwacheon-si (KR); Kwontaek Kwon, Hwaseong-si (KR); Jeongae Park, Seoul (KR); Minyoung Son, Hwaseong-si (KR); Minkyu Jeong, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/301,476

(22) PCT Filed: May 14, 2014

(86) PCT No.: PCT/KR2014/004300
§ 371 (c)(1),
(2) Date: Oct. 3, 2016

(87) PCT Pub. No.: WO2015/152459
PCT Pub. Date: Oct. 8, 2015

(65) Prior Publication Data
US 2017/0124723 A1    May 4, 2017

(30) Foreign Application Priority Data
Apr. 3, 2014 (KR) .......................... 10-2014-0040065

(51) Int. Cl.
G06T 7/40        (2017.01)
G06T 15/04       (2011.01)
(Continued)

(52) U.S. Cl.
CPC ............... *G06T 7/40* (2013.01); *G06T 1/20* (2013.01); *G06T 7/11* (2017.01); *G06T 11/001* (2013.01); *G06T 11/40* (2013.01); *G06T 15/04* (2013.01)

(58) Field of Classification Search
None
See application file for complete search history.

(56) References Cited

U.S. PATENT DOCUMENTS 6,288,730 B1 *  9/2001  Duluk, Jr. ................. G06T 1/60
                                                        345/428
7,522,169 B1     4/2009  Muliadi et al.
(Continued)

FOREIGN PATENT DOCUMENTS

| JP | 2006-67521 A   | 3/2006 |
|----|----------------|--------|
| JP | 2007-81795 A   | 3/2007 |
| KR | 2001-0067778 A | 7/2001 |

OTHER PUBLICATIONS

Lubor Ladicky et al, "Associative Hierarchical CRFs for Object Class Image Segmentation." In: IEEE 12th International Conference on Computer Vision, Kyoto, 739-746, Sep. 29, 2009. (8 pages in English).

(Continued)

*Primary Examiner* — Aaron M Richer
(74) *Attorney, Agent, or Firm* — Harness, Dickey & Pierce, P.L.C.

(57) ABSTRACT

A device for processing image data is disclosed. The device may determine a dominant texture with respect to each of a plurality of regions constituting an image. The device may group in a same group, from among the plurality of regions, regions in which the determined dominant texture is the same, and process allocated image data according to a result of grouping.

18 Claims, 9 Drawing Sheets

(51) Int. Cl.
*G06T 7/11* (2017.01)
*G06T 1/20* (2006.01)
*G06T 11/40* (2006.01)
*G06T 11/00* (2006.01)

(56) References Cited

U.S. PATENT DOCUMENTS

| | | | |
|---|---|---|---|
| 2002/0048402 A1* | 4/2002 | Braspenning | G06T 7/12 382/173 |
| 2005/0169509 A1* | 8/2005 | Grasslin | G06T 5/50 382/130 |
| 2010/0123717 A1 | 5/2010 | Jiao | |
| 2010/0177105 A1 | 7/2010 | Nystad et al. | |
| 2011/0216069 A1 | 9/2011 | Keall et al. | |
| 2013/0002663 A1 | 1/2013 | Howson | |
| 2013/0027402 A1 | 1/2013 | Iskenderian et al. | |
| 2013/0069943 A1 | 3/2013 | Kallio et al. | |
| 2013/0093768 A1* | 4/2013 | Lockerman | G06T 11/001 345/428 |
| 2015/0123988 A1* | 5/2015 | Ohmori | G06F 3/0481 345/594 |

OTHER PUBLICATIONS

International Search Report dated Dec. 12, 2014 in counterpart PCT/KR2014/004300 (9 pages in Korean with English Translation).

* cited by examiner

FRAME N

| Tile ID | Tex ID |
|---------|--------|
| 0 | 13 |
| 1 | 2 |
|   | 33 |
|   | ... |
|   |    |

FRAME N+1

FIG. 5B

| Tile ID | Tex ID |
|---------|--------|
| 0 | – |
| 1 | 1 |
| 2 | 2 |

...

| 8 | 1 |
| 9 | 2 |
| 10 | 2 |

...

| 13 | 1 |
| 14 | 1 |

METHOD AND DEVICE FOR PROCESSING IMAGE DATA

CROSS REFERENCE TO RELATED APPLICATION(S)

This application is a National Phase entry of PCT Application No. PCT/KR2014/004300, filed on May 14, 2014, which claims priority under 35 U.S. C. § 119(e), 120 and 365(c) to Korean Patent Application No. 10-2014-0040065, filed on Apr. 3, 2014, in the Korean Intellectual Property Office, the entire disclosures of each of which are incorporated herein by reference for all purposes.

TECHNICAL FIELD

The present invention relates to a method and a device for processing image data.

BACKGROUND ART

Technology for processing image data has improved as information and telecommunication technology has developed. A process of processing image data may include a process of determining a pixel value with respect to a predetermined region of an image.

In connection with computer graphics, computer graphics may be divided into two-dimensional (2D) graphics that express graphic objects in a 2D way and three-dimensional (3D) graphics that express objects like in the real world in a 3D way. Thus, a method of processing an image related to 2D graphics and 3D graphics has been disclosed.

DETAILED DESCRIPTION OF THE INVENTION

Technical Problem

The present invention provides a device that processes image data and data related to the image data together, thereby promptly processing the image data.

Technical Solution

According to an embodiment of the present invention, a method of processing image data includes determining a dominant texture with respect to each of a plurality of regions constituting an image; grouping the plurality of regions such that regions in which the determined dominant texture is the same among the plurality of regions are included in a same group; allocating image data corresponding to the plurality of grouped regions to a plurality of image data processing units; and processing the image data allocated to the plurality of image data processing units.

Advantageous Effects of the Invention

A method of processing image data according to various embodiments may process related image data together, thereby providing a method of promptly processing the image data.

DESCRIPTION OF THE DRAWINGS

FIGS. 5A through 5C are diagrams for describing a method in which a device allocates image data to a plurality of image data processing units and processes the image data according to various embodiments.

MODE OF THE INVENTION

Figure 1:
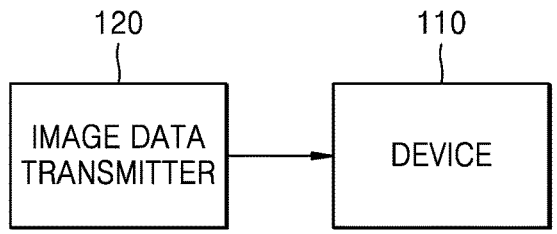
FIG. 1 is a diagram of a method and a device for processing image data according to various embodiments.

In various embodiments described in the present specification below, an 'image' may be comprehensively referred to as not only a still image but also a moving image such as a video.

A 'texture' described in the present specification below may mean an image that is mapped to a predetermined object. Alternatively, the texture may mean a two-dimensional (2D) image that is to be mapped to a surface of a three-dimensional (3D) object.

The terms of a singular form may include plural forms unless otherwise specified.

Embodiments will be described in detail with reference to the accompanying drawings below. With regard to descriptions of drawings, same or corresponding elements may be marked by same reference numerals, and redundant descriptions may be omitted.

A method and a device for processing image data according to various embodiments are disclosed with reference to FIGS. 1 through 8 below.

FIG. 1 is a diagram of a method and a device for processing image data according to various embodiments.

An image data transmitter 120 may transmit image data to a device 110. The device 110 may process the image data received from the image data transmitter 120. The device 110 may process the image data received from the image data transmitter 120 in real time while simultaneously receiving the image data from the image data transmitter 120.

The method by which the device 110 processes the image data will be described later.

Figure 2:
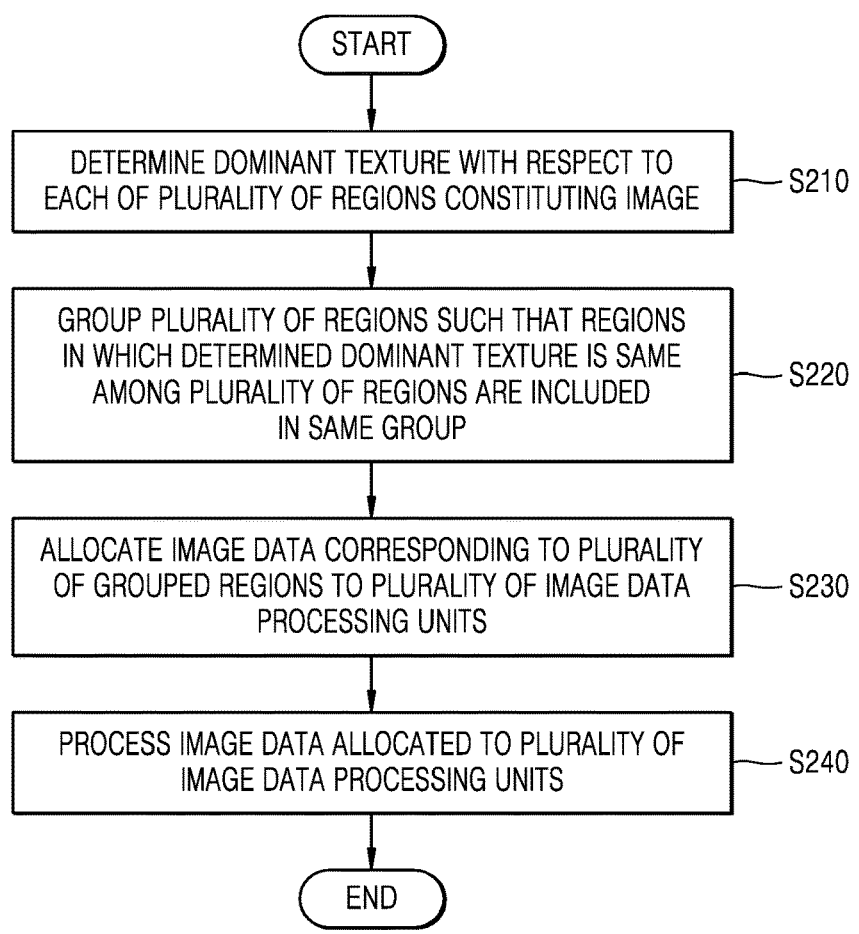
FIG. 2 is a flowchart for describing a method in which a device allocates image data to a plurality of image data processing units and processes the image data according to various embodiments.

FIG. 2 is a flowchart for describing a method in which the device 110 allocates image data to a plurality of image data processing units and processes the image data according to various embodiments.

In operation S210, the device 110 may determine a dominant texture with respect to each of a plurality of regions constituting an image.

The image may include the plurality of regions. Alternatively, the device 110 may divide the image into the plurality of regions. Alternatively, the device 110 may divide the image into a plurality of tiles.

The plurality of regions constituting the image may be rectangles or squares having the same size. The plurality of regions constituting the image may not overlap with each other.

The dominant texture may mean a texture corresponding to a broadest range in a region. Alternatively, the dominant texture may mean a texture having a highest use frequency in a region. The dominant texture may mean a dominant texture.

A plurality of objects may be located in an arbitrary region constituting the image. Alternatively, a plurality of primitives may be located in the arbitrary region constituting the image. A primitive may mean a factor necessary for creating a graphic design such as lines, circles, and polygons that may be drawn, stored, and modified as an individual substance by a graphics program in computer graphics.

When the plurality of objects are located in the arbitrary region constituting the image, textures related to the objects may be different from each other. For example, when a first object and a second object are located in the arbitrary region constituting the image, a texture related to the first object and a texture related to the second object may be different from each other. For another example, when the first object and the second object are located in the arbitrary region constituting the image, a texture mapped to the first object and a texture mapped to the second object may be different from each other.

When the plurality of primitives are located in the arbitrary region constituting the image, textures related to the respective primitives may be different from each other. For example, when a first primitive and a second primitive are located in the arbitrary region constituting the image, a texture related to the first primitive and a texture related to the second primitive may be different from each other.

For another example, when the first primitive and the second primitive are located in the arbitrary region constituting the image, a texture mapped to the first primitive and a texture mapped to the second primitive may be different from each other.

The device 110 may determine a dominant texture with respect to the arbitrary region constituting the image. For example, when the device 110 determines the dominant texture with respect to the arbitrary region constituting the image, if a plurality of objects are located in the arbitrary region, the device 110 may determine as the dominant texture with respect to the arbitrary region a texture having the highest use frequency among textures that are to be respectively mapped to the plurality of objects.

For another example, when the device 110 determines the dominant texture with respect to the arbitrary region constituting the image, if a plurality of primitives are located in the arbitrary region, the device 110 may determine as the dominant texture with respect to the arbitrary region a texture having a highest use frequency among textures that are to be respectively mapped to the plurality of primitives.

For another example, when the device 110 determines the dominant texture with respect to the arbitrary region constituting the image, if a plurality of objects are located in the arbitrary region, the device 110 may determine as the dominant texture with respect to the arbitrary region a texture that is to be mapped to an object that occupies a broadest range among the plurality of objects.

For another example, when the device 110 determines the dominant texture with respect to the arbitrary region constituting the image, if a plurality of primitives are located in the arbitrary region, the device 110 may determine as the dominant texture with respect to the arbitrary region a texture that is to be mapped to a primitive that occupies a broadest range among the plurality of primitives.

In operation S220, the device 110 may group a plurality of regions constituting a screen such that the regions in which the dominant texture determined in operation S210 is the same are included in the same group.

From the plurality of regions constituting the screen, the device 110 may select the regions in which the dominant texture determined in operation S210 is the same and set the selected regions as a single group. Thus, the dominant texture of the regions included in the single group may be the same.

For example, when first through tenth regions constitute the screen, if, in operation S210, the device 110 determines a dominant texture with respect to the first through fifth regions as a first texture and a dominant texture with respect to sixth through tenth regions as a second texture, the device 110 may group the first through fifth regions together as a first group and the sixth through tenth regions together as a second group.

In operation S230, the device 110 may allocate image data corresponding to the plurality of grouped regions to a plurality of image data processing units.

For example, the device 110 may allocate image data corresponding to regions of the same group to the same image data processing unit by using a result of grouping performed in operation S220.

Therefore, the image data corresponding to the regions in which the dominant texture is the same among the plurality of regions constituting the screen may be allocated to the same image data processing unit.

Alternatively, when an amount of image data corresponding to the regions set as a single group is greater than a predetermined reference, the device 110 may allocate the image data corresponding to the regions set as the single group to two or more image data processing units.

Therefore, when an amount of image data corresponding to the regions set as the single group is greater than the predetermined reference, image data corresponding to regions of the same group may be allocated to different image data processing units.

In operation S240, the device 110 may process the image data allocated to the image data processing units.

The device 110 may process the image data based on a result of allocating the image data to the plurality of image data processing units in operation S230.

Each of the image data processing units may process the image data allocated in operation S230.

For example, the device 110 may process the image data by using the result of allocating the image data in operation S230, and thus the same image data processing unit may process the image data corresponding to regions of the same group.

For another example, the device 110 may process the image data by using the result of allocating the image data in operation S230, and thus the same image data processing unit may process the image data corresponding to regions in which the dominant texture is the same among the plurality of regions constituting the screen.

The device 110 may process the image data in parallel. Alternatively, the plurality of image data processing units may process the image data in parallel.

For example, the plurality of image data processing units may simultaneously process different image data. Alternatively, only some of the plurality of image data processing units may process image data.

The image data processing unit may process data in a pipeline manner. Each of the image data processing units may simultaneously process different image data. Related image data may be processed by a single image data processing unit.

The device 110 may store the processed image data in an internal memory. The device 110 may perform an additional calculation on the processed image data stored in the internal memory and transmit the image data to an external device.

A process in which the device 110 processes the image data may include a process of determining a pixel value. Alternatively, an operation in which the device 110 processes the image data may include an operation in which the device 110 determines pixel values corresponding to the image data allocated to the plurality of image data processing units.

A method of determining a pixel value will be described in detail with reference to FIG. 3 below.

Figure 3:
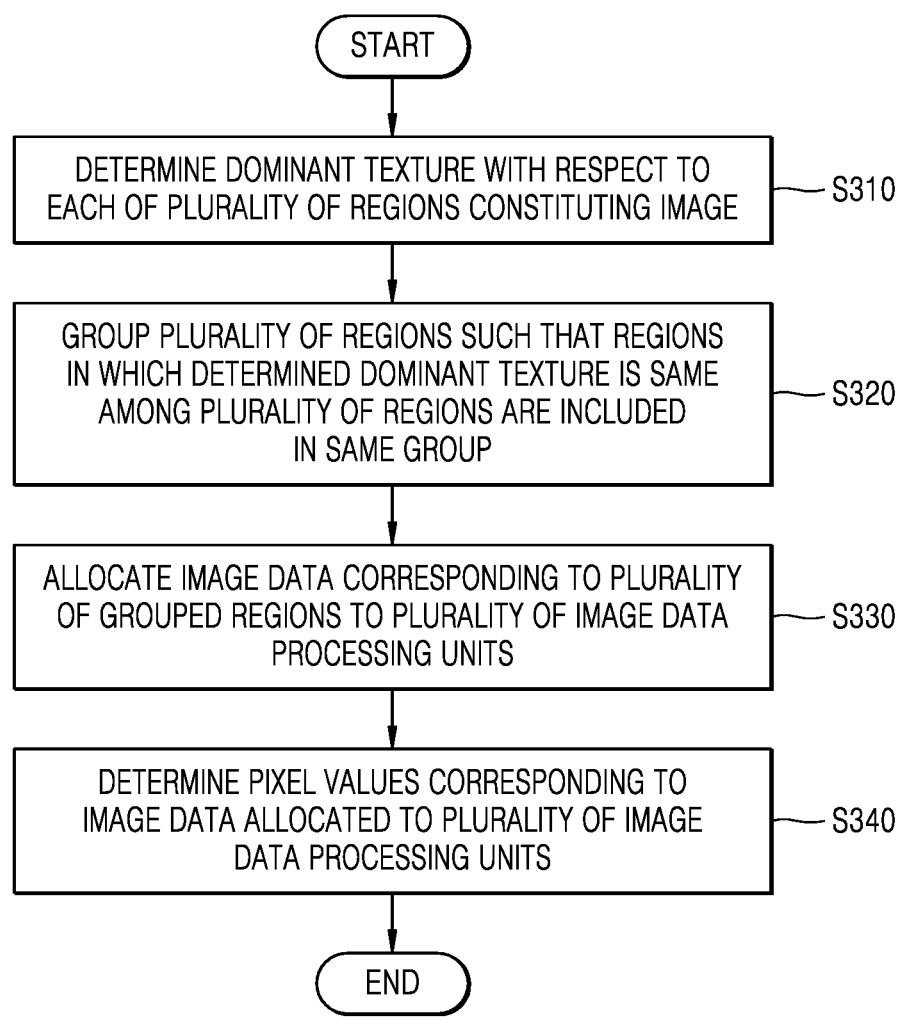
FIG. 3 is a flowchart for describing a method in which a device allocates image data to a plurality of image data processing units and determines pixel values corresponding to the allocated image data according to various embodiments.

FIG. 3 is a flowchart for describing a method in which the device 110 allocates image data to a plurality of image data processing units and determines pixel values corresponding to the allocated image data according to various embodiments.

Operations S310, S320, and S330 correspond to the descriptions provided in operations S210, S220, and S230, respectively, and thus detailed descriptions thereof are omitted for brevity.

In operation S340, the device 110 may determine the pixel values corresponding to the image data allocated to the plurality of image data processing units.

The device 110 may process the image data based on a result of allocating the image data to the plurality of image data processing units in operation S330 and thereby determine the pixel values.

For example, when a first image data processing unit processes image data corresponding to a first region, the first image data processing unit may determine pixel values of pixels corresponding to the first region.

Each of the image data processing units may determine the pixel values corresponding to the image data by using the image data allocated in operation S330.

For example, the device 110 may process the image data by using the result of allocating the image data in operation S330, and thus the same image data processing unit may determine pixel values corresponding to regions of the same group.

For another example, the device 110 may determine the pixel values by using the result of allocating the image data in operation S330, and thus the same image data processing unit may determine pixel values corresponding to regions in which a dominant texture is the same among a plurality of regions constituting a screen.

The device 110 may use a tile-based rendering technique. However, the device 110 is not implemented by being limited to the tile-based rendering technique.

The tile-based rendering technique may mean a method of splitting a screen into tiles having a certain size, storing a result of processing internal pixels according to the tiles in an internal memory having a high processing speed, and transmitting only a final result to a screen output memory space. The screen output memory space may be a frame buffer.

A process of determining colors of pixels constituting a screen may be referred to as pixel processing. The device 110 may include a plurality of pixel processing pipelines in order to simultaneously perform several pixel processing processes. The device 110 may distribute tile unit pixels such that a single pixel processing pipeline calculates all pixels with respect to a single tile region so as to increase efficiency of pixel processing.

As described above, when the device 110 processes pixels of a tile in order to distribute the tile to each pipeline, the device 110 may distribute tiles having a similarity in an external memory access tendency to a single pixel pipeline. The similarity in the external memory access tendency may mean whether tiles are related to the same texture. The device 110 may utilize a locality of a memory access in a pixel pipeline.

Figures 4A, 4B:
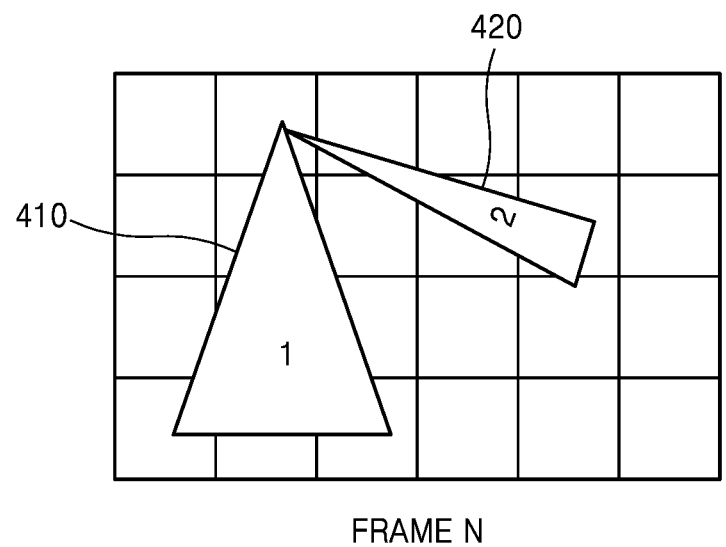
FIGS. 4A through 4C are diagrams for describing a method in which a device processes image data when frames are changed according to various embodiments.
Figure 4C:
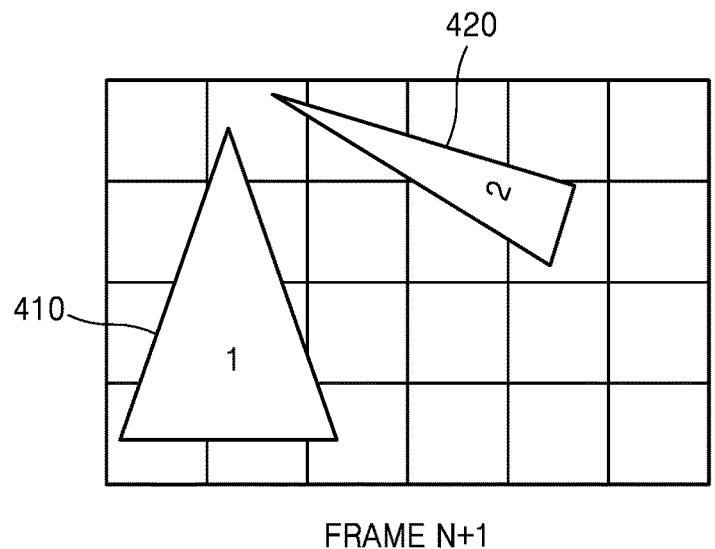

FIGS. 4A through 4C are diagrams for describing a method in which the device 110 processes image data when frames are changed according to various embodiments.

FIG. 4A is a diagram illustrating an Nth frame image. The Nth frame image may include a first object 410 and a second object 420.

The Nth frame image may include a plurality of regions. The plurality of regions constituting the Nth frame image may have the same size. However, a plurality of regions constituting an image do not need to be the same size.

Referring to FIG. 4A, the first object 410 and the second object 420 may extend in the plurality of regions.

The device 110 may determine a dominant texture with respect to each of the plurality of regions constituting the Nth frame image.

The dominant texture may mean a texture corresponding to a broadest range in a region. Alternatively, the dominant texture may mean a texture having a highest use frequency in a region.

A plurality of objects may be located in an arbitrary region constituting the Nth frame image. Alternatively, a plurality of primitives may be located in the arbitrary region constituting the Nth frame image.

When the plurality of objects are located in the arbitrary region constituting the Nth frame image, textures related to the objects may be different from each other. For example, when the first object 410 and the second object 420 are located in the arbitrary region constituting the Nth frame image, a texture related to the first object 410 and a texture related to the second object 420 may be different from each other. For another example, when the first object 410 and the second object 420 are located in the arbitrary region constituting the Nth frame image, a texture mapped to the first object 410 and a texture mapped to the second object 420 may be different from each other.

The device 110 may determine a dominant texture with respect the arbitrary region constituting the Nth frame image. For example, when the device 110 determines the dominant texture with respect to the arbitrary region constituting the Nth frame image, if a plurality of objects are located in the arbitrary region, the device 110 may determine as the dominant texture with respect to the arbitrary region a texture having a highest use frequency among textures that are to be respectively mapped to the plurality of objects.

For another example, when the device 110 determines the dominant texture with respect to the arbitrary region constituting the Nth frame image, if a plurality of objects are located in the arbitrary region, the device 110 may determine as the dominant texture with respect to the arbitrary region a texture that is to be mapped to an object that occupies a broadest range among the plurality of objects.

The device 110 may determine the dominant texture with respect to each of the plurality of regions constituting the Nth frame image.

The same texture image may be mapped to the same object. However, different texture images may be mapped to the same object.

The device 110 may obtain and store texture information used at a highest frequency for each of the plurality of regions constituting the Nth frame image.

Alternatively, the device 110 may split the Nth frame image into tiles having a certain size. The device 110 may obtain and store texture information used at a highest frequency for each of the tiles constituting the Nth frame image.

FIG. 4B is a table for describing a result of determining a dominant texture with respect to each of the regions constituting an image based on the Nth frame image.

For example, as shown in FIG. 4B, a dominant texture of a region having a tile ID of 0 may be a texture having a texture ID of 13, and a dominant texture of a region having a tile ID of 1 may be a texture having a texture ID of 2.

FIG. 4C is a diagram illustrating an N+1th frame image. The N+1th frame image may be different from the Nth frame image.

The device 110 may determine a dominant texture with respect to each of a plurality of regions constituting the N+1th frame image.

A method of determining the dominant texture with respect to each of the plurality of regions constituting the N+1th frame image may employ a method of determining a dominant texture with respect to each of a plurality of regions constituting the Nth frame image described above.

Therefore, the device 110 may determine the dominant texture with respect to each of the plurality of regions constituting the N+1th frame image. The device 110 may allow the same image data processing unit to process image data with respect to regions in which the dominant texture is the same among the plurality of regions constituting the N+1th frame image.

The device 110 may use a result of determining the dominant texture with respect to each of the plurality of regions constituting the Nth frame image when determining the dominant texture with respect to each of the plurality of regions constituting the N+1th frame image by using a similarity between the N+1th frame image and the Nth frame image.

For example, the device 110 may determine that the dominant texture with respect to each of the plurality of regions constituting the N+1th frame image is the same as the dominant texture with respect to each of the plurality of regions constituting the Nth frame image.

When the device 110 determines that the dominant texture with respect to each of the plurality of regions constituting the N+1th frame image is the same as the dominant texture with respect to each of the plurality of regions constituting the Nth frame image, the device 110 may group the plurality of regions such that regions in which the dominant texture is the same are included in the same group by using a result determined in the Nth frame image in spite of the N+1th frame image.

The device 110 may process image data by allocating the plurality of regions constituting the N+1th frame image to a plurality of image data processing units by using a result of grouping the plurality of regions constituting the Nth frame image.

For example, the device 110 may allow the same image data processing unit to process image data with respect to the regions constituting the N+1th frame image and corresponding to regions in which the dominant texture is the same among the plurality of regions constituting the Nth frame image.

Alternatively, when the device 110 processes the image data with respect to the N+1th frame image, in the same manner as processing the image data with respect to the Nth frame image, the device 110 may allow the same image data processing unit to process the image data with respect to the regions in which the dominant texture is the same among the plurality of regions constituting the N+1th frame image.

When the same image data processing unit processes image data with respect to regions in which a dominant texture is the same, a time taken to process the image data may be reduced.

Referring to FIGS. 4A through 4C, the first object 410 and the second object 420 may mean different primitives. For example, the Nth frame image of FIG. 4A may include the first primitive 410 and the second primitive 420.

Figure 5A:
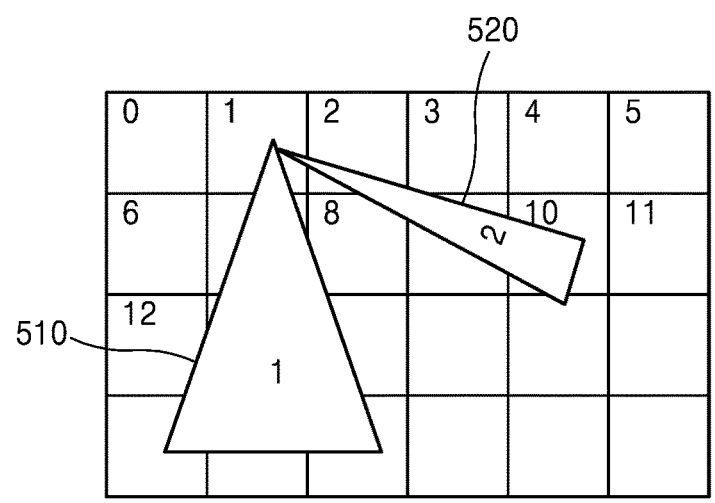
Figure 5B:
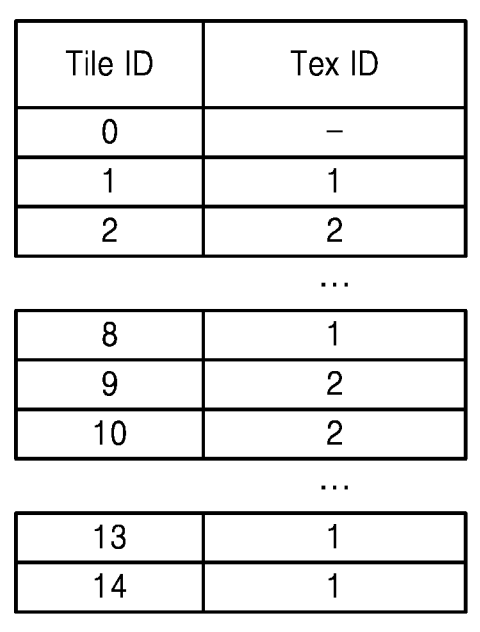
Figure 5C:
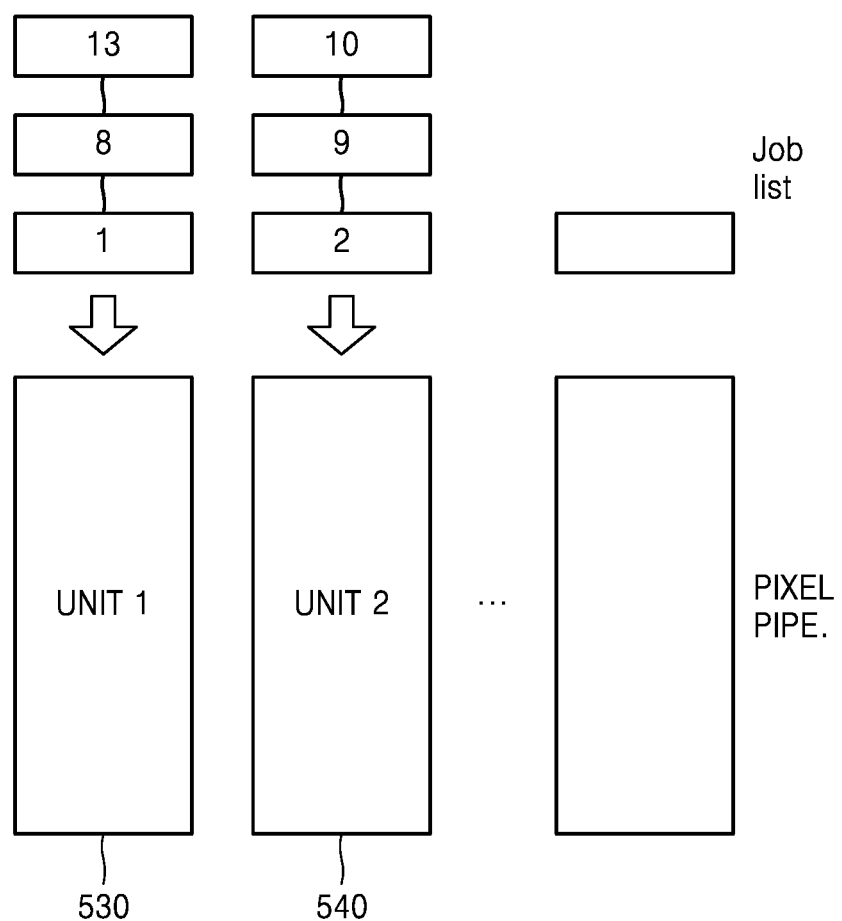

FIGS. 5A through 5C are diagrams for describing a method in which the device 110 allocates image data to a plurality of image data processing units and processes the image data according to various embodiments.

The device 110 may refer to a result obtained from an Nth frame image when rendering an N+1th frame image. The device 110 may render a plurality of regions constituting the Nth frame image and simultaneously renew or store texture information that is the most referred to by each of the regions.

FIG. 5A is a diagram illustrating an example of an image. The image may include a first primitive 510 and a second primitive 520.

The image may include a plurality of regions. The plurality of regions constituting the image may have the same size. However, the plurality of regions constituting the image do not need to have the same size.

Referring to FIG. 5A, the first primitive 510 and the second primitive 520 may extend in the plurality of regions.

The device 110 may determine a dominant texture with respect to each of the plurality of regions constituting the image.

The dominant texture may mean a texture corresponding to a broadest range in a region. Alternatively, the dominant texture may mean a texture having a highest use frequency in a region.

A plurality of objects may be located in an arbitrary region constituting the image. Alternatively, a plurality of primitives may be located in the arbitrary region constituting the image.

When the plurality of primitives are located in the arbitrary region constituting the image, textures related to the primitives may be different from each other. For example, when the first primitive 510 and the second primitive 520 are located in the arbitrary region constituting the image, a texture related to the first primitive 510 and a texture related to the second primitive 520 may be different from each other. For another example, when the first primitive 510 and the second primitive 520 are located in the arbitrary region constituting the image, a texture mapped to the first primitive 510 and a texture mapped to the second primitive 520 may be different from each other.

The device 110 may determine a dominant texture with respect the arbitrary region constituting the image. For example, when the device 110 determines the dominant texture with respect to the arbitrary region constituting the image, if a plurality of primitives are located in the arbitrary region, the device 110 may determine as the dominant texture with respect to the arbitrary region a texture having a highest use frequency among textures that are to be respectively mapped to the plurality of primitives.

For another example, when the device 110 determines the dominant texture with respect to the arbitrary region constituting the image, if a plurality of primitives are located in the arbitrary region, the device 110 may determine as the dominant texture with respect to the arbitrary region a texture that is to be mapped to a primitive that occupies a broadest range among the plurality of primitives.

The device 110 may determine the dominant texture with respect to each of the plurality of regions constituting the image.

The same texture image may be mapped to the same primitive.

FIG. 5B is a table for describing a result of determining a dominant texture with respect to each of the regions constituting an image.

For example, as shown in FIG. 5B, there is no dominant texture of a region having a tile ID of 0, a dominant texture of a region having a tile ID of 1 may be a texture having a texture ID of 1, a dominant texture of a region having a tile ID of 2 may be a texture having a texture ID of 2, a dominant texture of a region having a tile ID of 8 may be a texture having a texture ID of 1, a dominant texture of a region having a tile ID of 9 may be a texture having a texture ID of 2, a dominant texture of a region having a tile ID of 10 may be a texture having a texture ID of 2, a dominant texture of a region having a tile ID of 13 may be a texture having a texture ID of 1, and a dominant texture of a region having a tile ID of 14 may be a texture having a texture ID of 1.

The texture having a texture ID of 1 may mean a texture mapped to the first primitive 510. The texture having a texture ID of 2 may mean a texture mapped to the second primitive 520.

When two or more primitives are located in the same region, the device 110 may determine as a dominant texture of the region a texture related to a primitive that occupies a wider range.

For example, both the first primitive 510 and the second primitive 520 are located in the region having a tile ID of 1. However, since the first primitive 510 occupies a wider range in the region having a tile ID of 1 than the second primitive 520, the device 110 may determine the dominant texture of the region having a tile ID of 1 as the texture having a texture ID of 1 that is a texture mapped to the first primitive 510.

When two or more primitives are located in the same region, the device 110 may determine as a dominant texture of the region a texture having a highest use frequency among textures that are to be respectively mapped to the two or more primitives.

For example, both the first primitive 510 and the second primitive 520 are located in the region having a tile ID of 1. However, in the region having a tile ID of 1, when a use frequency of a texture mapped to the first primitive 510 is higher than a use frequency of a texture mapped to the second primitive 520, the device 110 may determine the dominant texture of the region having a tile ID of 1 as the texture having a texture ID of 1 that is a texture mapped to the first primitive 510.

FIG. 5C is a diagram for describing a method of processing data related to an image for each region.

As shown in FIG. 5C, a first image data processing unit 530 may process image data with respect to regions having tile IDs of 1, 8, and 13 that are regions in which a texture having a texture ID of 1 is a dominant texture. A second image data processing unit 540 may process image data with respect to regions having tile IDs of 2, 9, and 10 that are regions in which a texture having a texture ID of 2 is a dominant texture. The first image data processing unit 530 may process image data with respect to regions having tile IDs of 1, 8, and 13 that are regions in which the texture having a texture ID of 2 is a dominant texture (540).

Therefore, the device 110 may allow the same image data processing unit to process image data of regions related to the same dominant texture.

Figure 6:
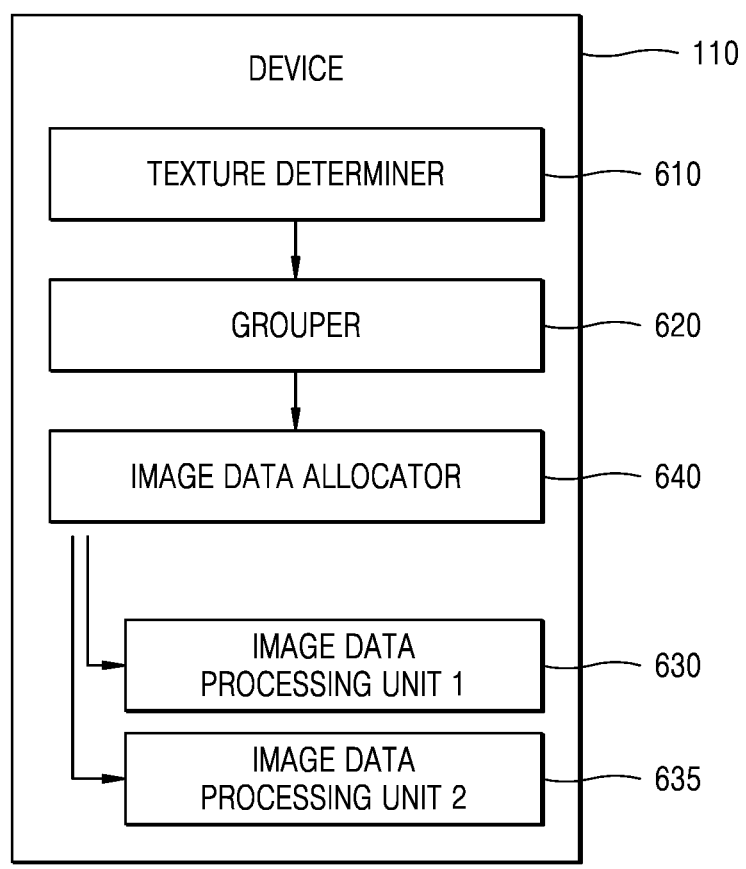
FIG. 6 is a block diagram for describing a structure of a device that processes image data according to various embodiments.
Figure 7:
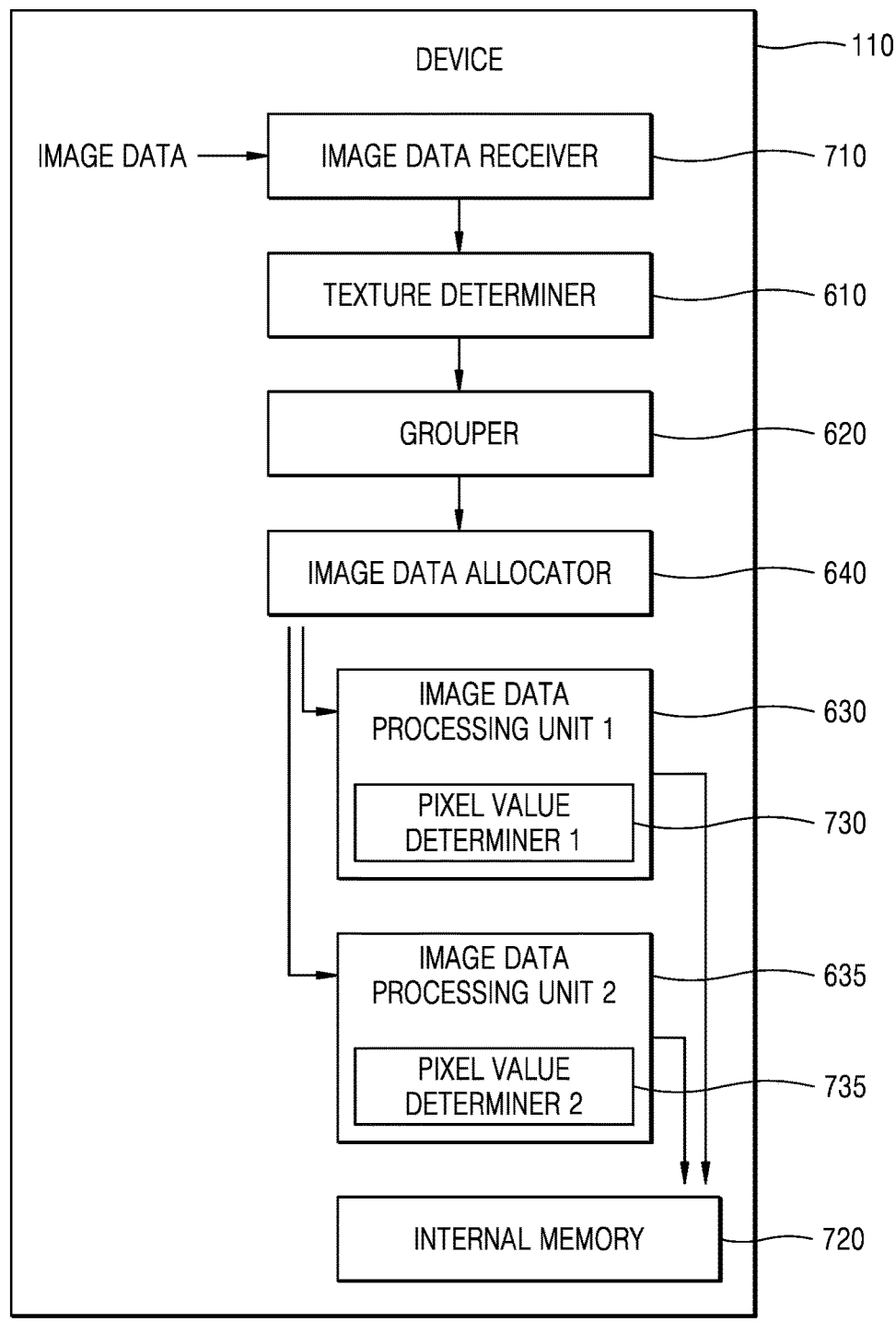
FIG. 7 is a block diagram for describing a structure of a device that processes image data and store the image data in an internal memory according to various embodiments.
Figure 8:
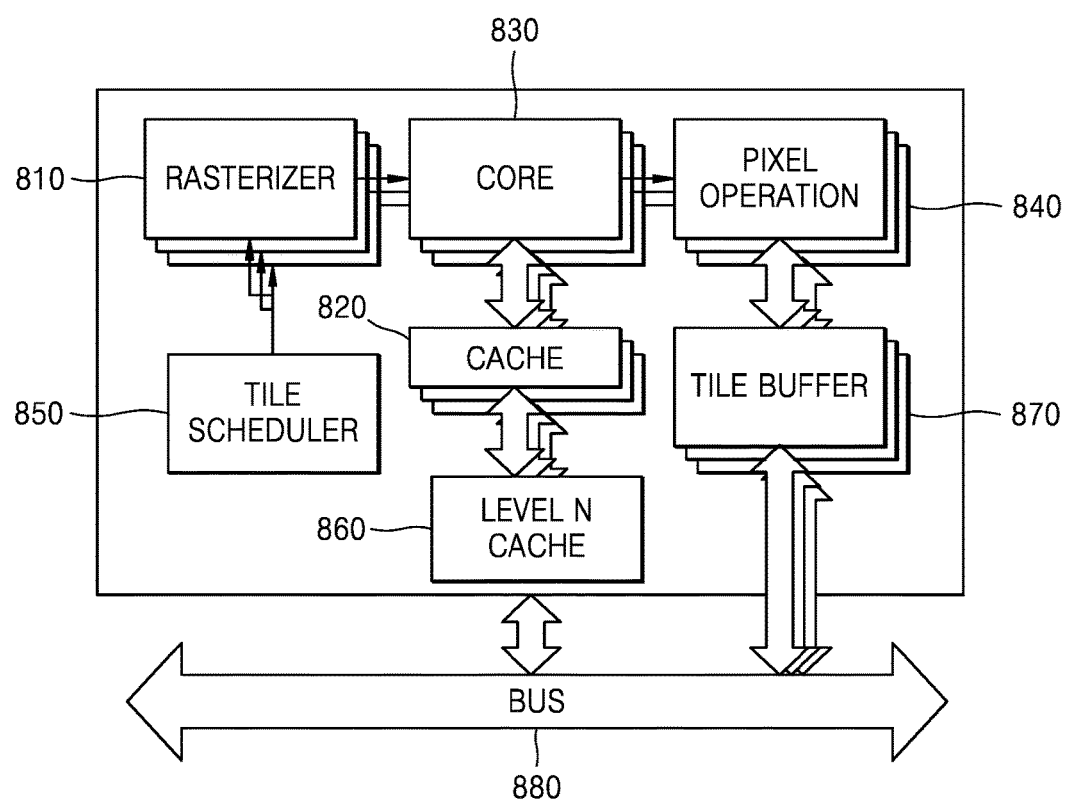
FIG. 8 is a block diagram for describing a device that processes image data according to various embodiments.

FIGS. 6 through 8 are embodiments of the device 110 according to various embodiments. The device 110 may be a device for performing a method of processing image data described above and may implement all embodiments for performing the method of processing image data described above.

FIG. 6 is a block diagram for describing a structure of the device 110 that processes image data according to various embodiments.

As shown in FIG. 6, the device 110 may include a texture determiner 610, a grouper 620, an image data allocator 640, and image data processing units 630 and 635. However, the device 110 may be implemented by more or less elements than the elements shown in FIG. 6.

The elements will now be described below.

The texture determiner 610 may determine a dominant texture with respect to each of a plurality of regions constituting an image.

The image may constitute a plurality of images. Alternatively, the device 110 may split the image into the plurality of regions.

The plurality of regions constituting the image may be rectangles or squares having the same size. The plurality of regions constituting the image may not overlap with each other.

The dominant texture may mean a texture corresponding to a broadest range in a region. Alternatively, the dominant texture may mean a texture having a highest use frequency in a region. The dominant texture may mean a dominant texture.

A plurality of objects may be located in an arbitrary region constituting the image. Alternatively, a plurality of primitives may be located in the arbitrary region constituting the image. A primitive may mean a factor necessary for creating a graphic design such as lines, circles, and polygons that may be drawn, stored, and modified as an individual substance by a graphics program in computer graphics.

When the plurality of objects are located in the arbitrary region constituting the image, textures related to the objects may be different from each other. For example, when a first object and a second object are located in the arbitrary region constituting the image, a texture related to the first object and a texture related to the second object may be different from each other. For another example, when the first object and the second object are located in the arbitrary region constituting the image, a texture mapped to the first object and a texture mapped to the second object may be different from each other.

When the plurality of primitives are located in the arbitrary region constituting the image, textures related to the respective primitives may be different from each other. For example, when a first primitive and a second primitive are located in the arbitrary region constituting the image, a texture related to the first primitive and a texture related to the second primitive may be different from each other.

For another example, when the first primitive and the second primitive are located in the arbitrary region constituting the image, a texture mapped to the first primitive and a texture mapped to the second primitive may be different from each other.

The texture determiner 610 may determine a dominant texture with respect to the arbitrary region constituting the image. For example, when the texture determiner 610 determines the dominant texture with respect to the arbitrary region constituting the image, if a plurality of objects are located in the arbitrary region, the texture determiner 610 may determine as the dominant texture with respect to the arbitrary region a texture having the highest use frequency among textures that are to be respectively mapped to the plurality of objects.

For another example, when the texture determiner 610 determines the dominant texture with respect to the arbitrary region constituting the image, if a plurality of primitives are located in the arbitrary region, the texture determiner 610 may determine as the dominant texture with respect to the arbitrary region a texture having a highest use frequency among textures that are to be respectively mapped to the plurality of primitives.

For another example, when the texture determiner 610 determines the dominant texture with respect to the arbitrary region constituting the image, if a plurality of objects are located in the arbitrary region, the texture determiner 610 may determine as the dominant texture with respect to the arbitrary region a texture that is to be mapped to an object that occupies a broadest range among the plurality of objects.

For another example, when the texture determiner 610 determines the dominant texture with respect to the arbitrary region constituting the image, if a plurality of primitives are located in the arbitrary region, the texture determiner 610 may determine as the dominant texture with respect to the arbitrary region a texture that is to be mapped to a primitive that occupies a broadest range among the plurality of primitives.

The grouper 620 may group a plurality of regions constituting a screen such that the regions in which the dominant texture determined by the texture determiner 610 is the same are included in the same group.

The grouper 620 may select the regions in which the dominant texture determined by the texture determiner 610 is the same from the plurality of regions constituting the screen and set the selected regions as a single group. Thus, the dominant texture of the regions included in the single group may be the same.

For example, when first through tenth regions constitute the screen, if the texture determiner 610 determines a dominant texture with respect to the first through fifth regions as a first texture and a dominant texture with respect to sixth through tenth regions as a second texture, the grouper 620 may group the first through fifth regions together as a first group and the sixth through tenth regions together as a second group.

The image data allocator 640 may allocate image data corresponding to the plurality of grouped regions to the plurality of image data processing units 630 and 635.

For example, the device 110 may allocate image data corresponding to the regions of the same group to the same image data processing unit by using a result of grouping performed by the grouper 620.

Therefore, the image data corresponding to the regions in which the dominant texture is the same among the plurality of regions constituting the screen may be allocated to the first image data processing unit 630.

Alternatively, when an amount of image data corresponding to the regions set as a single group is greater than a predetermined reference, the image data allocator 640 may allocate the image data corresponding to the regions set as the single group to the two or more image data processing units 630 and 635.

Therefore, when the an amount of image data corresponding to the regions set as the single group is greater than the predetermined reference, image data corresponding to regions of the same group may be allocated to different image data processing units.

The image data processing units 630 and 635 may process the image data allocated thereto.

The device 110 may process the image data based on a result of allocating the image data to the plurality of image data processing units 630 and 635 in the image data allocator 640.

Each of the image data processing units 630 and 635 may process the image data allocated by the image data allocator 640.

For example, the image data processing unit 630 may process the image data by using the result of allocating the image data in the image data allocator 640, and thus the first image data processing unit 630 may process the image data corresponding to regions of the same group.

For another example, the first image data processing unit 630 may process the image data by using the result of allocating the image data from image data allocator 640, and thus the first image data processing unit 630 may process the image data corresponding to regions in which the dominant texture is the same among the plurality of regions constituting the screen.

The image data processing units 630 and 635 may process the image data in parallel. Alternatively, the plurality of image data processing units 630 and 635 may process the image data in parallel.

For example, the image data processing units 630 and 635 may simultaneously process different image data. Alternatively, only some of the image data processing units 630 and 635 may process image data.

The image data processing units 630 and 635 may process data in a pipeline manner. Each of the image data processing units 630 and 635 may simultaneously process different image data. Related image data may be processed by a single image data processing unit.

A process in which the image data processing units 630 and 635 process the image data may include a process of determining a pixel value. Alternatively, the image data processing units 630 and 635 may determine pixel values corresponding to the image data allocated thereto.

A method of determining a pixel value is described in detail with reference to FIG. 3.

FIG. 7 is a block diagram for describing a structure of the device 110 that processes image data and stores the image data in an internal memory according to various embodiments.

As shown in FIG. 7, the device 110 may include an image data receiver 710, the texture determiner 610, the grouper 620, the image data allocator 640, the image data processing units 630 and 635, and an internal memory 720. The image data processing units 630 and 635 may include pixel value determiners 730 and 735. However, the device 110 may be implemented by more or less elements than the elements shown in FIG. 7.

The elements will now be described below.

The texture determiner 610, the grouper 620, the image data allocator 640, and the image data processing units 630 and 635 are described with reference to FIG. 6 above, and detailed descriptions thereof are omitted for brevity.

The image data receiver 710 may receive image data. The device 110 may receive the image data from the image data transmitter 120, as described in FIG. 1 above, and the image data receiver 710 of the device 110 may receive the image data.

The internal memory 720 may receive and store the image data processed by the image data processing units 630 and 635. The image data stored in the internal memory 720 may be transmitted to an external device after an additional calculation is performed on the image data.

The pixel value determiners 730 and 735 may be located in the image data processing units 630 and 635, respectively. The pixel value determiners 730 and 735 may receive image data allocated by the image data allocator 640 and determine pixel values corresponding to the received image data.

The pixel value determiners 730 and 735 may determine pixel values corresponding to image data allocated to the image data processing units 630 and 635.

The pixel value determiners 730 and 735 may process the image data and determine the pixel values based on a result from the image data allocator 640 of allocating the image data to the image data processing units 630 and 635.

For example, when the first image data processing unit 630 processes image data corresponding to a first region, the pixel value determiner 730 included in the first image data processing unit 630 may determine pixel values of pixels corresponding to the first region.

Each of the image data processing units 630 and 635 may determine pixel values corresponding to the image data by using the image data allocated by the image data allocator 640.

For example, image data may be processed by using a result of allocating the image data from the image data allocator 640, and thus the same image data processing unit may determine pixel values corresponding to regions of the same group.

For another example, the pixel value determiners 730 and 735 may determine pixel values by using the result of allocating the image data from the image data allocator 640, and thus the same pixel value determiners may determine pixel values of regions in which a dominant texture is the same among a plurality of regions constituting a screen.

FIG. 8 is a block diagram for describing the device 110 that processes image data according to various embodiments.

FIG. 8 illustrates a pixel processing operation of a GPU that operates in a tile-based rendering technique. A set of a rasterizer 810, a core 830, and a pixel operation 840 that processes a single tile may be referred to as a pixel channel. A single channel may process a single tile and then process a next tile in the same process. Each channel may be utilized in a calculation of a pixel after the core 830 reads a value of an external memory through a cache 820. Each channel may sequentially store values of pixels completed after a per-fragment operation in a color buffer. If an allocated tile is completely processed, the per-fragment operation may store content of the color buffer in the external memory. A tile scheduler 850 may distribute tiles that are to be processed by each pixel. The device 110 may serve as the tile scheduler 850.

The tile scheduler 850 may transmit distribution information of the tiles that are to be processed by each pixel to the rasterizer 810.

The rasterizer 810 may receive the distribution information of the tiles from the tile scheduler 850 and transmit data related to image data to the core 830.

The core 830 may obtain the image data from the cache 820 and process the image data by using the data received from the rasterizer 810. The cache 820 may be connected to a cache 860 having a level of N.

The pixel operation 840 may receive the image data processed by the core 830 and process the image data in a pixel unit.

A tile buffer 870 may be connected to a bus 880 and transmit and receive data to and from the bus 880. The tile buffer 870 may be connected to the pixel operation 840 and transmit and receive the image data in the pixel unit to and from the pixel operation 840.

The method and device according to various embodiments described above can be written as computer programs and can be implemented in general-use digital computers that execute the programs using a computer-readable recording medium.

Examples of the computer-readable recording medium include magnetic storage media (e.g., ROM, floppy disks, hard disks, etc.), optical recording media (e.g., CD-ROMs, DVDs, etc.).

The computer-readable recording medium can also be distributed over network-coupled computer systems so that the computer-readable code is stored and executed in a distributed fashion. In this case, at least one of a plurality of distributed computers may perform some of the suggested functions and transmit a result of performing to at least one of other distributed computers; the computer that receives the result may also perform some of the suggested functions, and also provide a result of performing to other distributed computers.

Unless the context dictates otherwise, the word "comprise" or variations such as "comprises" or "comprising" is understood to mean "includes, but is not limited to" such that other elements that are not explicitly mentioned may also be included. Unless otherwise defined herein, all the terms used herein, which include technical or scientific terms, may have the same meaning that is generally understood by a person skilled in the art. It will be further understood that terms, which are defined in a dictionary, should also be interpreted as is customary in the relevant related art and not in an idealized or overly formal meaning unless expressly so defined herein in this specification.

The invention claimed is:

1. A method of processing image, the method comprising:
determining a dominant texture with respect to each of a plurality of regions constituting an $n^{th}$ image from among textures respectively related to a plurality of objects in the plurality of regions;
grouping the plurality of regions such that regions from among the plurality of regions in which the determined dominant texture is the same are included in a same group;
allocating image data corresponding to the grouped plurality of regions to a plurality of image data processing units; and
processing the image data allocated to the plurality of image data processing units,
wherein pixel information of the dominant texture is reused when processing the image data corresponding to the grouped plurality of regions, and wherein a result of determining the dominant texture with respect to each of the plurality of regions constituting the $n^{th}$ image is reused when determining a dominant texture with respect to each of a plurality of regions constituting an n+1$^{th}$ image.

2. The method of claim 1, wherein the dominant texture is a texture related to an object among the plurality of objects occupying a broadest range of a respective one of the plurality of regions.

3. The method of claim 1, wherein the dominant texture is a texture having a highest use frequency among textures related to objects in a respective region.

4. The method of claim 1, wherein the processing of the image data comprises: processing the image data in parallel, wherein the processing is performed by the plurality of image data processing units.

5. The method of claim 1, wherein the processing of the image data comprises: determining pixel values corresponding to the image data allocated to the plurality of image data processing units.

6. The method of claim 1, wherein the dominant texture is an image mapped to a predetermined object.

7. The method of claim 1, wherein the plurality of regions are rectangles or squares having a same size and do not overlap with each other.

8. The method of claim 1, further comprising: storing the processed image data in an internal memory.

9. The method of claim 1, wherein the plurality of image data processing units process the image data in a pipeline manner.

10. The method of claim 1, wherein the determining includes determining at least two dominant textures corresponding to at least two different objects or primitives within the n$^{th}$ image.

11. The method of claim 1, wherein the determining includes:
identifying a subset of the plurality of objects in each respective region of the plurality of regions, each object of the plurality of objects having a texture;
determining, for each respective region, a dominant object in the subset occupying a broadest range of the respective region; and
determining the dominant texture of the respective region as the texture of the dominant object of the respective region.

12. The method of claim 1, wherein the determining includes:
identifying a subset of the plurality of objects in each respective region of the plurality of regions, each object of the plurality of objects having a texture; and
determining, for each respective region, a dominant texture as the texture of a highest quantity of objects of the subset in the respective region.

13. A device comprising:
a memory having computer-readable instructions stored thereon;
a plurality of image data processing units configured to process image data; and
one or more processors communicatively coupled to the memory and configured to execute the computer-readable instructions to
determine a dominant texture with respect to each of a plurality of regions constituting an n$^{th}$ image from among textures respectively related to a plurality of objects in the plurality of regions;
group the plurality of regions such that regions from among the plurality of regions in which the determined dominant texture is the same are included in a same group; and
allocate image data corresponding to the grouped plurality of regions to the plurality of image data processing units,
wherein pixel information of the dominant texture is reused when processing the image data corresponding to the grouped plurality of regions, and wherein a result of determining the dominant texture with respect to each of the plurality of regions constituting the n$^{th}$ image is reused when determining a dominant texture with respect to each of a plurality of regions constituting an n+1$^{th}$ image.

14. The device of claim 13, wherein the dominant texture is a texture related to an object among the plurality of objects occupying a broadest range of a respective one of the plurality of regions.

15. The device of claim 13, wherein the dominant texture is a texture having a highest use frequency among textures related to objects in a respective region.

16. The device of claim 13, wherein the plurality of image data processing units process in parallel the allocated image data.

17. The device of claim 13, wherein each of the plurality of image data processing units is further configured to determine pixel values corresponding to the allocated image data.

18. The device of claim 13, further comprising: an internal memory configured to store the image data processed by the plurality of image data processing units.

* * * * *